United States Patent [19]

Ejima

[11] Patent Number: 5,016,337
[45] Date of Patent: May 21, 1991

[54] PRODUCTION METHOD FOR NET STRUCTURES

[76] Inventor: Kimie Ejima, 1-10-14-801, Kaga, Itabashi-ku Tokyo, Japan

[21] Appl. No.: 484,547

[22] Filed: Feb. 26, 1990

[51] Int. Cl.$^5$ .......................................... B23P 17/00
[52] U.S. Cl. .................................... 29/418; 29/423; 29/163.6; 245/9
[58] Field of Search ............... 29/418, 423, 413, 416, 29/417, 163.6, 163.8; 245/1, 2, 4, 5, 9; 140/3 A; 264/DIG. 81; 425/DIG. 109

[56] References Cited

U.S. PATENT DOCUMENTS

| | | | |
|---|---|---|---|
| 920,537 | 5/1909 | Canne | 245/9 |
| 1,019,830 | 3/1912 | Pejchar | 245/9 |
| 1,231,345 | 6/1917 | Fuhrmann | 245/9 |
| 2,460,654 | 2/1949 | Reinstein | 245/4 X |
| 2,753,139 | 7/1956 | Chisholm | 245/9 |

FOREIGN PATENT DOCUMENTS 13007 of 1911 United Kingdom .................... 245/9

*Primary Examiner*—Joseph M. Gorski
*Assistant Examiner*—S. Thomas Hughes
*Attorney, Agent, or Firm*—Kalish & Gilster

[57] ABSTRACT

The present invention relates to a method of producing net structures by connecting annular net elements with connectors. The present method includes a net strip forming process in which a net strip is formed with a plurality of annular sections for net elements arranged in a predetermined pattern and joined with the net strip through joints on the outer edges of the annular sections, a connecting process in which all adjacent annular sections of the net strip are connected to each other with a connector in a position where no joint is provided, and a separation process in which the joints are cut off to separate each annular section from the net strip for formation of the net elements. According to the invention, a net strip is punched to have a plurality of annular sections and with the annular sections kept joined with the strip, the adjacent annular sections are connected to each other with a connector, and then the annular sections are cut off from the strip to form individual net elements. Thus a troublesome process to arrange all the net elements in position is eliminated and the only thing to do is to connect the annular sections provided in position in the strip. This easier and more accurate connection of net elements facilitates the mass production of net structures and improves the yield.

8 Claims, 3 Drawing Sheets

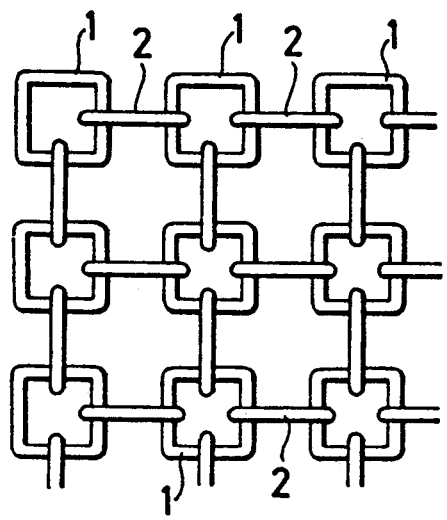
FIG.9
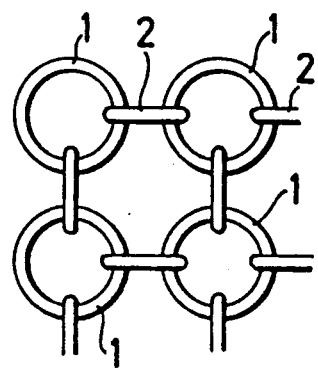
FIG.10
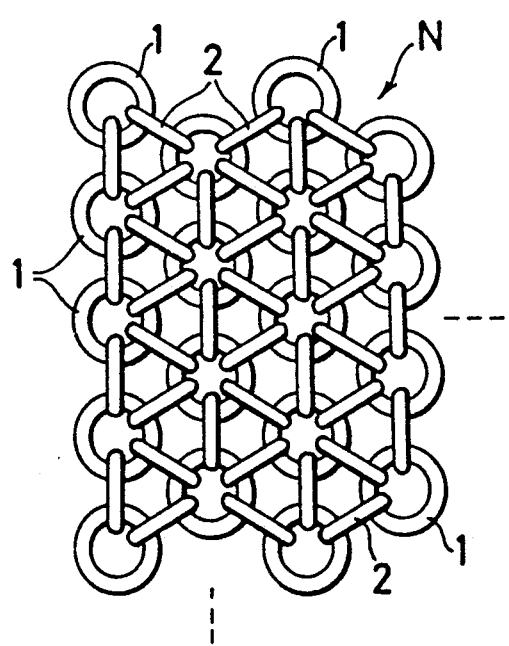
FIG.11
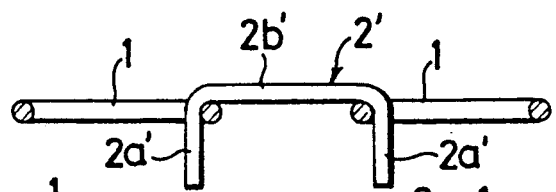
FIG.12(A)
FIG.12(B)
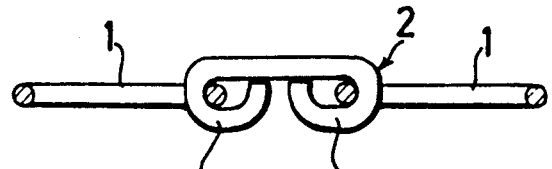
FIG.12(C)

PRODUCTION METHOD FOR NET STRUCTURES

BACKGROUND OF THE INVENTION

1. Field of the Invention

This invention relates to a method of producing net structures by connecting annular net elements with connectors.

2. Description of the Prior Art

It is well known that a net structure of metal such as aluminum (a rat guard net) is an effective means against rat damages. Taking advantage of the rats' habit of not gnawing moving things, this net structure is made by connecting, in a movable manner, a plurality of annular net elements (rings) arranged lengthwise and breadthwise in a plane with connectors. If any articles to be protected against rats are covered with this net structure, the rats cannot gnaw them because the net structure trembles the instant the rats touch it.

In addition to the rat guard net, this type of net structures is adopted for fish preserves by some fish farms, and also sometimes used as a decoration net.

FIG. 11 shows an example of this type of net structure N, in which annular net elements 1 are arranged in a plurality of rows. The rows are in a staggered arrangement by half pitch per row to make each annular element 1 surrounded by six such elements and every two adjacent elements 1 are connected to each other with a connector 2.

As shown in FIG. 12, the connector 2 consists of a staple 2' which includes a pair of arm sections 2a' and a connecting section 2b' between the arm sections 2a' as shown in FIG. 12(A). To form the connector 2, the staple 2' is shaped into a loop as shown in FIG. 12(B) or both the arm sections 2a' are rounded into curl sections 2A (FIG. 12(C)) similarly to ordinary staples.

According to a prior method of producing the net structure formed of annular net elements connected by connectors, a metal strip of, for example, aluminum is first press-cut into a plurality of annular net elements such as that shown at 1. These net elements are transported with a vibrating conveyor to a connection table, where the elements are arranged in position and the two adjacent elements are connected to each other with a connector to provide a finished net structure.

As described above, the prior method requires transportation of the net elements 1 to the connection table to connect them with a connecting device of the same principle as ordinary staplers. Therefore, if each element is not in position, the staple as the connector cannot fit in the annular element, resulting in incomplete formation of the net structure.

Moreover, because each annular ring element 1 is too small and light to be transported accurately, it is often out of position on the connection table. Such out-of-position conditions not only prevent formation of the desired net structure, but also require many temporary stops of the machine to take an additional action, for example, to remove defective net structures. This causes low yield and low efficiency and impedes mass production of the net structures.

SUMMARY OF THE INVENTION

It is, therefore, an object of the present invention to provide a method of producing net structures by connecting a plurality of net elements of a predetermined shape with connectors.

It is another object of the present invention to provide easy and accurate connection of net elements to improve the yield and facilitate mass production of the net structures.

The present invention is characterized in that a net strip is punched to have a plurality of annular sections joined with the strip, the adjacent annular sections are connected to each other with a connector, and then the annular sections are cut off from the strip to form individual net elements. Thus a troublesome process requiring arrangement of all the net elements in a specific position is eliminated and the only thing to do is to connect the annular sections provided while still in position in the strip. This easier and more accurate connection of net elements can make possible the mass production of net structures and raise the yield.

Accordingly, the invention is, briefly, a method of producing net structures by connecting a plurality of annular net elements with connectors. The method comprises forming a net strip having a plurality of annular sections for forming net elements. The annular sections are arranged in a predetermined pattern and joined with the annular sections. All adjacent annular sections of the net strip are connected to each other with a connector in a position where no joint is provided and each annular section is separated from the net strip for formation of the net elements by cutting off the joints.

Other features and advantages of the invention will be apparent from the following description taken in connection with the accompanying drawings.

BRIEF DESCRIPTION OF THE DRAWINGS

FIGS. 1 through 8 show an embodiment of the present invention:

FIG. 1 is a partial plan view of a net strip punched during a strip forming process according to the present invention, in which shaded portions are left unpunched;

FIG. 3 is a plan view of the net strip with the annular sections connected with connectors;

FIG. 4 is a cross-sectional view showing a process to connect two annular sections with a connector;

FIG. 5 is a plan view showing dies and punches used for cutting off the annular sections, in which hatched portions show the punches and the dies;

FIG. 6 is a plan view showing the arrangement of two net structures to be connected with each other;

FIG. 8 is an enlarged partial plan view of another net strip, in which hatched portions are left unpunched.

FIGS. 9 through 11 are plan views of various patterns of net structures.

FIG. 12(A) is a cross-sectional view of a staple engaged with two net elements to connect them as a connector.

FIG. 12(B) is a cross-sectional view showing another connector formed of the staple shown in FIG. 12(A).

FIG. 12(C) is a cross-sectional view showing still another connector formed of the staple shown in FIG. 12(A).

DESCRIPTION OF THE PREFERRED EMBODIMENT OF THE INVENTION

Referring to the attached drawings, an embodiment according to the present invention will be described below in detail.

For the present embodiment, an aluminum strip is worked to produce net structures having a plurality of annular net elements 1 arranged in a staggered pattern as shown in FIG. 11 and connected with connectors 2 as shown, for example, in FIGS. 11 and 12(C).

Figure 1:
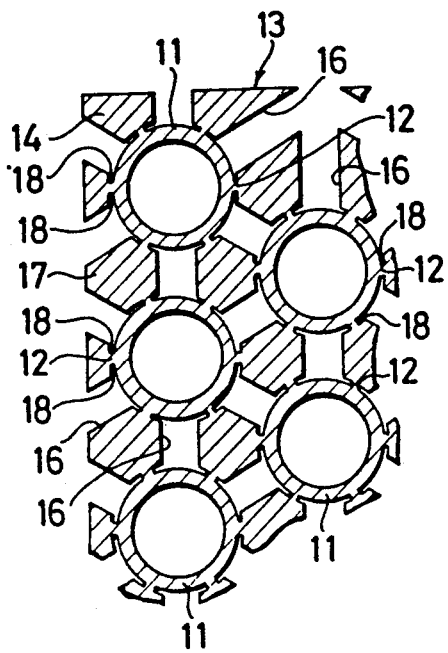

According to the present method, as shown in FIG. 1, the aluminum strip is first punched to form a net strip 13 which has a plurality of annular sections 11 arranged in a staggered pattern. Each annular section 11 has several small joints 12 on its outer edge and the annular section 11 is kept joined with the strip 13 by the joints 12. It should be noted that shaded portions in FIG. 1 are not cross-sections, but unpunched portions of the aluminum strip. This process is herein referred to as "net strip forming process".

Figure 2A:
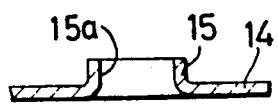
FIGS. 2(A) through 2(C) are enlarged cross-sectional views of annular sections formed in the net strip.
Figure 2B:
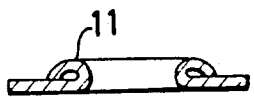

In this process, the strip 14 of an aluminum sheet or coil is first punched to form preliminary holes 15a smaller than the finished ones 11a and then the inner edge of each hole 15a is burred to form a cylindrical section 15 projecting toward one side of the strip 14 as shown in FIG. 2(A). Then the cylindrical section 15 is curled to form an annular section 11 for a net element as shown in FIG. 2(B).

Figure 2C:
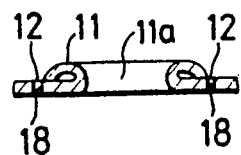

Then, the strip 14 is punched again to form a net strip 13 of a pattern shown in FIG. 1. Between each annular section 11 and six annular sections 11 surrounding it, radially extending punched holes 16 are made and a plate section 17 between the adjacent punched holes 16 is joined with the annular sections 11 through only small portions of its ends, each of which has slits 18. In this pattern, a very narrow joint portion 12 is left between the slits 18 to join the plate section 17 with one of the annular sections 11. Except for at the edges of the net strip 13, each of the annular sections 11 is joined to the net strip 13 through six joints 12 which are radially arranged at 60° intervals. The annular sections 12 are joined to each other only by the joints 12 (FIGS. 1 and 2(c)) When the joints 12 are cut, the annular sections 12 for net elements are cut off from the net strip 13 to form the net elements 1 (FIGS. 9-12(c)).

After the net strip 13 is formed as described above, the adjacent annular sections 11 are connected to each other with the connectors 2 in a position where the joint 12 is not provided (i.e. the position corresponding to the hole 16 shown in FIG. 1). This process is herein referred to as "connecting process".

Figure 4:
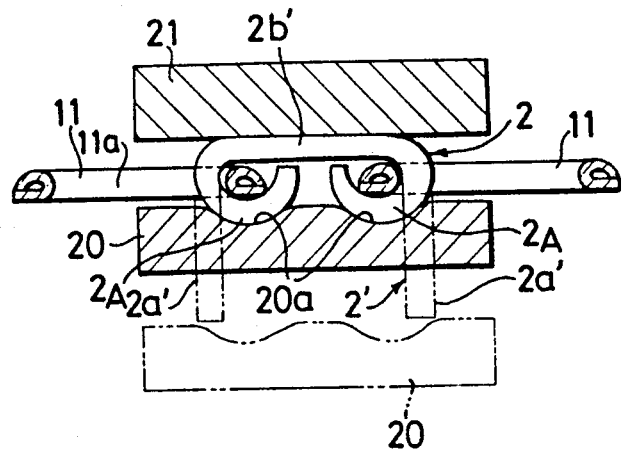

In this connecting process, the staples 2' formed of wire, as shown in FIG. 4 are used as the connectors 2. Each staple 2' includes a pair of arm sections 2a' and a connecting section 2b' between the arm sections 2a'. Referring to FIG. 4, the connecting process will be further explained below.

First, both of the arm sections 2a' of the staple 2' are inserted into holes 11a of two adjacent annular sections 11 in a position corresponding to (in overlaying fashion) the hole 16 between the annular sections 11. Then, with the ends of the arm sections 2a' thrusted against recesses 20a of a lower die 20 (which position is shown in phantom in FIG. 4), the connecting section 2b' is pressed down toward the lower die 20 by an upper die 21 to curl the arm sections 2a' along the curved recesses 20a toward the connecting section 2b' as shown by the solid lines in FIG. 4. This forms the connector 2 with the curls 2A loosely holding the annular sections 11 under their arms.

The connecting process can be performed automatically by arranging in position a plurality of staplers of the same principle as ordinary staplers in the direction of connector rows and by operating the staplers simultaneously or in a given sequence. It should be appreciated that, for example, a given number of staplers arranged along the line $O_1$-$O_1$ of FIG. 3, another given number of staplers along the line $O_2$-$O_2$, and still another given number of staplers along the line $O_3$-$O_3$ can provide all the connectors 2 in a single motion relative to the net strip 13.

After the connectors 2 are formed to connect the adjacent annular sections 11, the joints 12 are cut to separate the annular sections 11 from the net strip 13. This process turns the annular sections 11 into the net elements 1 and produces the net structure N in which the net elements 1 are connected to each other with the connectors 2. This process is herein referred to as "separation process".

Figure 3:
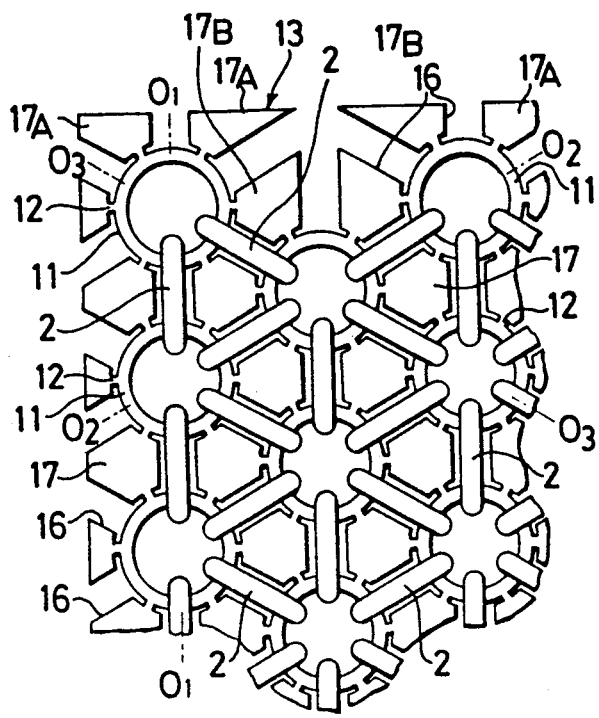
Figure 5:
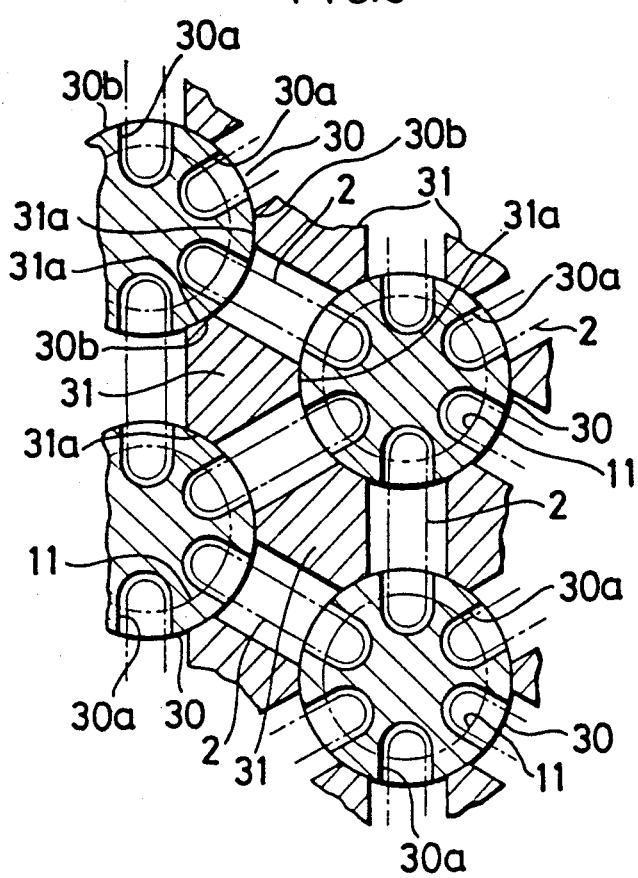

The separation process can be performed by cutting the joints 12 of FIG. 3 with dies and punches (a given number of the joints 12 are cut at each punching). FIG. 5 shows an example of the dies 30 and the punches 31 used for this process. Each of the dies 30 is a cylindrical member with recesses 30a to protect the corresponding connectors 2 and cutting edges 30b provided between the adjacent recesses 30a. The cylindrical member has an outer diameter similar to that of the annular section 11. The dies 30 provided are as many as the annular sections 11 within the whole or a certain area of the net strip 13 shown in FIG. 3 and support the annular sections 11 from the underside.

Each punch 31 is a column member of an equilateral triangular cross-section with each corner bevelled. The lower edge of the bevelled face has a cutting edge 31a which cuts off the joint 12 in cooperation with the corresponding cutting edge 30b of the die 30. Each punch 31 comes into an area surrounded by three dies 30 and cuts off the appropriate joints 12 from the annular sections 11. The punch 31 is smaller than the plate section 17 (FIGS. 1 and 3) left unpunched between the adjacent annular sections 11 so that the punch 31 does not touch any connectors 2 during the cutting of the joints 12. This can avoid possible damage to the connectors 2.

It should be appreciated that each process from the net strip forming process to the separation process described above may be assigned to one work station and all the processes may be performed separately or sequentially while feeding the aluminum sheet or coil.

Figure 6:
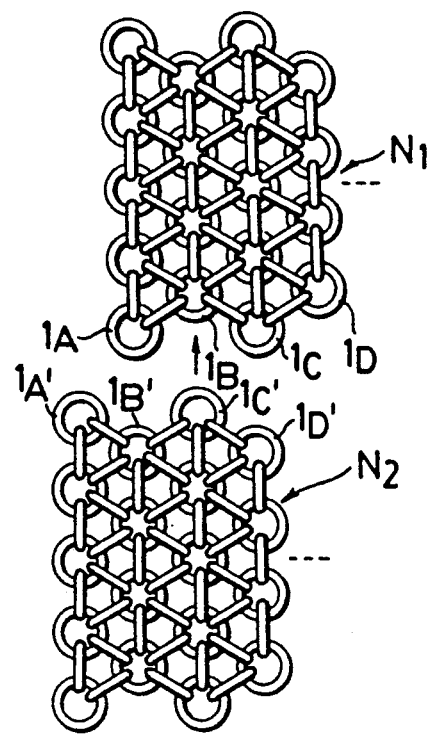
Figure 7A:
FIG. 7(A) is a cross-sectional view of an annular section formed in another way.
Figure 7B:
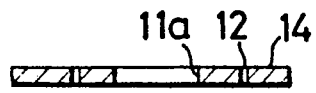
FIG. 7(B) is a cross-sectional view of an annular section formed in still another way.

As with the present embodiment, the half-pitch-staggered arrangement of rows of annular net elements can reduce the space between one net element 1 and another adjacent element 1 resulting in net structure products of smaller mesh size. Thus, the staggered arrangement of the net elements 1 makes each end of the net structure N staggered (i.e., unevent of jagged). The size of the net structure N is limited to that of an aluminum sheet or coil used, but a larger net structure can be obtained by connecting a plurality of net structures $N_1$, $N_2$, ... with each structure shifted laterally by one pitch, that is, connecting the adjacent net elements 1A and 1B', 1B and 1C', 1C and 1D', ... with the connectors. This connection may be carried out after the individual net structures $N_1$, $N_2$, ... are formed or may be carried out by connecting the annular sections of a plurality of net strips before the separation process described above. In the latter case, a plurality of net strips 13 whose annular sections 11 have been connected with the connectors 2 are punched to cut off the plate sections 17A and 17B in FIG. 3 at the ends of each strip 13 and those strips 13 are arranged similarly to FIG. 6 to connect to each other by connecting their adjacent annular sections with the connectors.

In the present embodiment, each annular section 11 is burred and curled to be of hollow ring shape. This process can give excellent appearance to the net element 1 because of the rounded annular section 11. However, the present invention is not limited to the formation of net element 1 described above and the net element may be obtained by simply punching the strip without any additional work, that is, by punching the strip 14 to form holes 11a and then again punching the strip 14 with the joints 12 left unpunched to form the annular sections 11.

In the above description, the connector 2 is shaped as shown in FIG. 12(C) but it may be shaped into a loop as shown in FIG. 12(B). For the purpose of the present invention, the connector 2 may be of any shape and, for example, it may be shaped into a ring.

According to the present embodiment, the net strip 13 has the holes 16 across which the connectors 2 are attached to adjacent annular net elements 11 and each hole 16 is large enough to pass the connector 2 therethrough. Therefore, the holes 16 are helpful to remove the connectors 2 from the net strip 13 through them and also to facilitate separation of the net structure N from the net strip 13.

Figure 8:
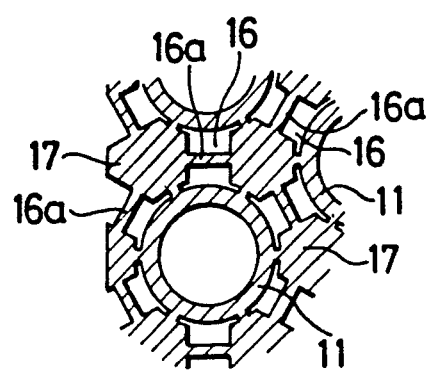

As with the present embodiment, for the connector 2 with the curls 2A formed by curling the ends of the staple 2', there must be holes 11a provided around the annular sections 11 to hold the curls 2A. The holes 16 in the present embodiment also perform this function. However, a bridge 16a may be provided in the middle of the hole 16 as shown in FIG. 8 to hold each of the curls 2A of the connector 2 within a corresponding hole on each side of the bridge 16a. The bridges 16a are then cut off during the separation process described above so as not to inhibit removal of the connectors 2 from strip 13.

The net elements 1 of the present embodiment are of annular shape but the elements may be of square shape as shown in FIG. 9 or a combination of differently shaped net elements may be used.

Moreover, in the present embodiment, the net elements 1 are in staggered arrangement. If larger mesh size is acceptable, however, the elements 1 may be in nonstaggered arrangement as shown in FIG. 10.

The net structure according to the present embodiment is made of aluminum but may be made of other kinds of material, for example, stainless steel, copper, titanium, or plastics.

To form plastic net elements for the present invention, a plastic net strip may be punched as described above for the present embodiment or injection molded. For injection-molded net elements, metal connectors of the present embodiment or thermal-molded plastic connectors may be used.

As many apparently widely different embodiments of the present invention may be made without departing from the spirit and scope thereof, it is to be understood that the invention is not limited to the specific embodiments thereof except as defined in the appended claims.

What is claimed is:

1. A method of producing net structures by connecting a plurality of annular net elements with connectors, said method comprising:
    forming a net strip having a plurality of annular sections for forming net elements, the annular sections being arranged in a predetermined pattern and joined with each other through a respective joints;
    connecting all adjacent annular sections of the net strip to each other with a connector in a position where no joint is provided; and
    separating each annular section from the net strip for formation of the net elements by cutting off the joints.

2. The method of producing net structures according to claim 1, wherein said forming step comprises forming the net strip with holes for removal of the joints, each of the holes being formed large enough relative to the connectors to permit passage therethrough of one of the connectors.

3. The method of producing net structures according to claim 1, wherein the step of connecting adjacent annular sections comprises shaping a joint wire with a pair of arm sections and a connecting section between the arm sections by inserting each arm section of the joint wire into one of the adjacent annular sections and curling the arm section toward the connecting section.

4. The method of producing net structures according to claim 1, wherein the step of connecting adjacent annular sections comprises shaping a joint wire with a pair of arm sections and a connecting section between the arm sections, including shaping the connecting section into a loop for each joint by inserting each arm section of the joint wire into one of the adjacent annular sections and bending the arm section so as to be substantially parallel to the connecting section.

5. The method of producing net structures according to claim 1, including forming said net strip from material selected from the group consisting of aluminum, stainless steel, copper, titanium, and plastics.

6. The method of producing net structures according to claim 1, wherein the step of forming holes the net strip comprises forming in the net strip having a diameter smaller than a final inner diameter of the annular sections, burring an inner edge of each hole thereby forming a cylindrical section projecting toward one side of the net strip, and then curling the cylindrical section thereby forming the annular section.

7. The method of producing net structures according to claim 1, wherein said step of forming the net strip comprises punching the net strip thereby forming holes having a diameter smaller than a final inner diameter of the annular sections and further punching the net strip thereby forming the annular sections with the joints left unpunched.

8. A method of producing net structures by connecting a plurality of annular net elements with connectors, comprising:
    forming a net strip with a plurality of annular sections for forming net elements and having outer edges, the annular sections arranged in a predetermined pattern and joined with the net strip through joints on the outer edges of the annular sections;
    connecting adjacent annular sections of the net strip to each other with a connector in a position where no joint is provided; and
    cutting off the joints, thereby separating each annular section from the net strip for thereby forming the net elements.

* * * * *

UNITED STATES PATENT AND TRADEMARK OFFICE
CERTIFICATE OF CORRECTION

PATENT NO. : 5,016,337
DATED : May 21, 1991
INVENTOR(S) : Kimie Ejima

It is certified that error appears in the above-identified patent and that said Letters Patent is hereby corrected as shown below:

Col. 6, line 7, delete "a";

line 40, after "holes" insert --in--;

line 43, after "hole" insert --,--; and line 66, delete "for" and insert --,--.

Signed and Sealed this

Sixth Day of October, 1992

Attest:

DOUGLAS B. COMER

*Attesting Officer*      Acting Commissioner of Patents and Trademarks